United States Patent
Stephenson et al.

(10) Patent No.: US 8,117,220 B2
(45) Date of Patent: Feb. 14, 2012

(54) ARTIFICIAL RECORD ADDED TO A DATABASE

(75) Inventors: Bryan Stephenson, Alviso, CA (US); Ersin Uzun, Irvine, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 296 days.

(21) Appl. No.: 12/433,791

(22) Filed: Apr. 30, 2009

(65) Prior Publication Data

US 2010/0281069 A1 Nov. 4, 2010

(51) Int. Cl.
*G06F 17/30* (2006.01)
(52) U.S. Cl. ................................................ 707/757
(58) Field of Classification Search .................. 707/1, 3, 707/757; 713/200; 382/100
See application file for complete search history.

(56) References Cited

U.S. PATENT DOCUMENTS

| | | | | |
|---|---|---|---|---|
| 4,908,873 | A * | 3/1990 | Philibert et al. | 382/100 |
| 6,574,732 | B1 | 6/2003 | Steinberg et al. | |
| 6,813,368 | B1 * | 11/2004 | Khanna et al. | 382/100 |
| 2003/0167402 | A1 * | 9/2003 | Stolfo et al. | 713/200 |
| 2004/0254908 | A1 * | 12/2004 | Tada | 707/1 |
| 2006/0190418 | A1 * | 8/2006 | Huberty et al. | 705/402 |
| 2008/0109417 | A1 * | 5/2008 | Moskowitz et al. | 707/3 |

OTHER PUBLICATIONS

Agrawal et al., "A System for Watermarking Relational Databases," SIGMOD 2003, Jun. 9-12, 2003, 1 p.
Agrawal et al., "Watermarking Relational Databases," Proceedings of the 28th VLDB Conference, Hong Kong, China, 2002, 12 p.
Agrawal et al., "Watermarking relational data; framework, algorithms and analysis," Proceedings of the 28th VLDB Conference, Hong Kong, China, 2002, 13 p.
Cox et al., "Secure Spread Spectrum Watermarking for Multimedia," Published in IEEE Trans. on Image Processing, 6, 12, 1673-1687, (1997), 31 p.
Katzenbeisser et al., "Information Hiding Techniques for Steganography and Digital Watermarking," Copyright 2000 @ Artech House, Inc., 6 p.
USPS—Address Verification, Copyright 2009 USPS, 3 p. [Online] http://www.usps.com/business/addressverification/welcome.htm.
Zhang et al., "A Method of Protecting Relational Databases Copyright with Cloud Watermark," Proceedings of World Academy of Science, Engineering and Technology, vol. 3, Jan. 2005, ISSN 13-7-6884, 5 p.
R. Venkatesan et al., "A Graph Theoretic Approach to Software Watermarking," Mar. 23, 2000, 9 p.
M. Atallah et al., "Natural Language Watermarking and Tamperproofing," F.A.P. Petitcolas (Ed): IH 2002, LNCS 2578, pp. 196-212, 2003, 17 p.
R. Sion et al., "Rights Protection for Relational Data," IEEE Transactions on Knowledge and Data Engineering, vol. 16, No. 12, Dec. 2004, 1509-1525, 17 p.
R. Sion, "Proving Ownership over Categorical Data," Proceedings of the 20th International Conference on Data Engineering (ICDE '04), 12 p.

(Continued)

*Primary Examiner* — Etienne Leroux

(57) ABSTRACT

A method comprises receiving a database containing records. The method further comprises determining a number of artificial records to add to the database to achieve a false negative mark detection rate less than a specified threshold. The method also comprises marking the database by adding the determined number of artificial records to the database. Each artificial record contains at least one value that, when used, is detectable by a third party. The false negative rate comprises a probability of failing to detect the mark in a discovered subset of the database.

21 Claims, 3 Drawing Sheets

OTHER PUBLICATIONS

S. Liu et al., "A Block Oriented Fingerprinting Scheme in Relational Database," ICISC 2004, LNCS 3506, pp. 455-466, 2005, 12 p.

Y. Li et al., "Fingerprinting Relational Databases: Schemes and Specialties," IEEE Transactions on Dependable and Secure Computing, vol. 2, No. 1, Jan.-Mar. 2005, 12 p.

N. Johnson et al., "Information Hiding: Steganography and Watermarking—Attacks and Countermeasures," Book Reviews, Journal of Electronic Imaging, Jul. 2001, vol. 10(3), 825, 2 p.

M. Huang et al., "A New Watermark Mechanism for Relational Data," pp. 946-950, Copyright 2004 IEEE, 5 p.

F. Guo et al., "An Improved Algorithm to Watermark Numeric Relational Data," WISA 2005, LNCS 3786, pp. 138-149, 2006, 12 p.

D. Gross-Amblard, "Query-preserving Watermarking of Relational Databases and XML Documents," PODS 2003, Jun. 9-12, 2003, pp. 191-201, 11 p.

K. Fukushima et al., "A Software Fingerprinting Scheme for Java Using Classfiles Obfuscation," WISA 2003, LNCS 2908, pp. 303-316, 2004, 14 p.

I. Cox et al., "Digital Watermarking," Book Reviews, 414 Journal of Electronic Imaging, Jul. 2002, vol. 11(3), 1 p.

Topkara et al., "Natural Language Watermarking," Security, Steganography, and Watermarking of Multimedia Contents VII, edited by Delp et al., Proc. of SPIE-IS&T Electronic Imaging, SPIE vol. 5681, Copyright 2005 SPIE and IS&T, 12 p.

Collberg et al., "Software Watermarking: Models and Dynamic Embeddings," POPL 99, San Antonio, Texas, USA, Copyright ACM 1999, 14 p.

Collberg et al., "Dynamic Path-Based Software Watermarking," Proc. SIGPLAN '04 Conference on Programming Language Design and Implementation, PLDI '04, Jun. 9-11, 2004, Washington, DC, USA, 12 p.

Topkara et al., "Natural Language Watermarking: Challenges in Building a Practical System," Proc. of the SPIE International Conference on Security, Steganography, and Watermarking of Multimedia Contents, Jan. 15-19, 2006, 14 p.

Sion et al., "Rights Protection for Relational Data and Sensor Streams," Center for Education and Research in Information Assurance and Security (CERIAS), Symposium 2004 Posters (see p. 15), Purdue University, 25 p. [Online] http://www.cerias.purdue.edu/news_and_events/events/symposium/2004/posters.

Sion et al., "Resilient Rights Protection for Sensor Streams," Proc. Of the 30th VLDB Conference, Toronto, Canada, 2004, 17 p.

Sion et al., "Rights Protection for Relational Data," IEEE Transactions on Knowledge and Data Engineering, vol. 16, No. 6, Jun. 2004, 17 p.

* cited by examiner

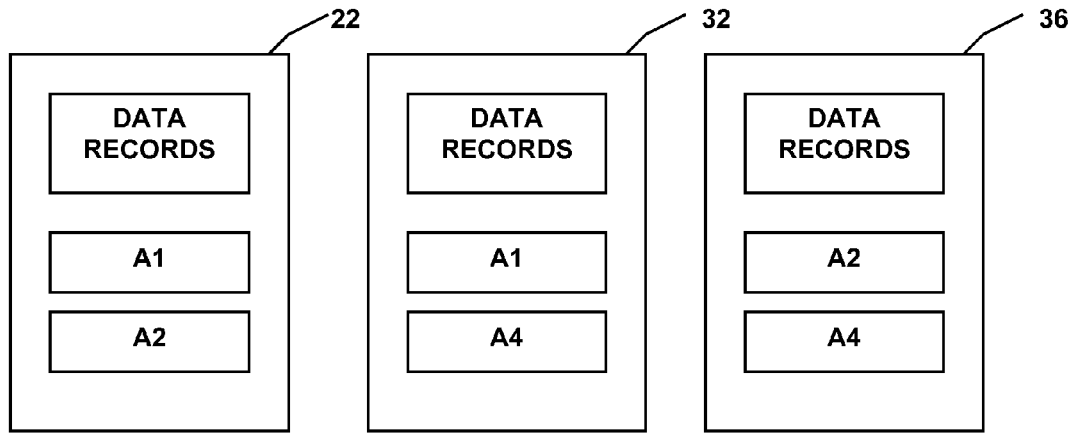
FIG. 4
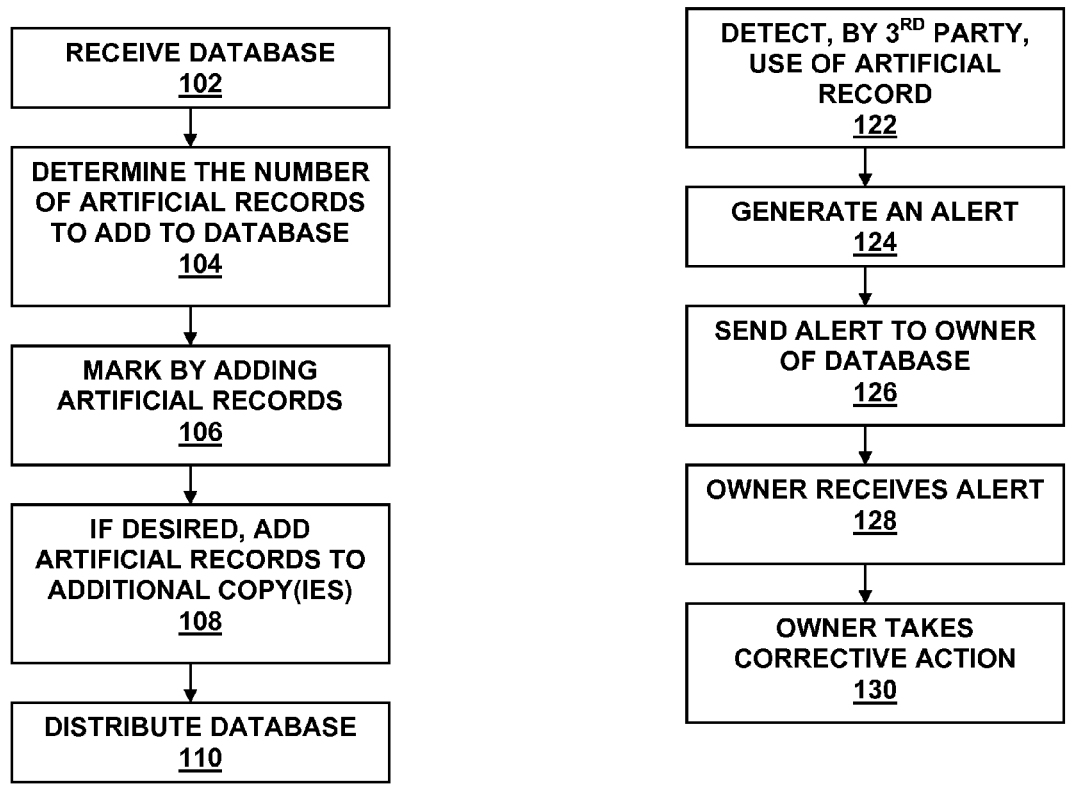
FIG. 5
FIG. 6

ARTIFICIAL RECORD ADDED TO A DATABASE

BACKGROUND

Demanding market conditions are such that some companies outsource certain business processes and associated activities to third parties. Maintaining proper confidentiality of business-critical data is a significant concern for this approach. In many cases, third-party service providers need access to such information as the company's intellectual property, client/customer data, or other confidential information to carry out their services. However, a service provider may not be fully trusted or may not be securely administered. Furthermore, it can be difficult or nearly impossible to enforce confidentiality policies across different administrative domains. Some types of data (e.g., relational databases) are particularly easy to duplicate, and an unscrupulous service provider may have a financial incentive to redistribute commercially valuable data to unauthorized parties.

BRIEF DESCRIPTION OF THE DRAWINGS

For a detailed description of exemplary embodiments of the invention, reference will now be made to the accompanying drawings in which:

FIGS. 2-4 illustrate different ways of marking multiple copies of a database in accordance with various embodiments;

FIG. 5 shows a method of marking a database in accordance with various embodiments; and FIG. 6 shows a method detecting and responding to leaks of the database in accordance with various embodiments.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
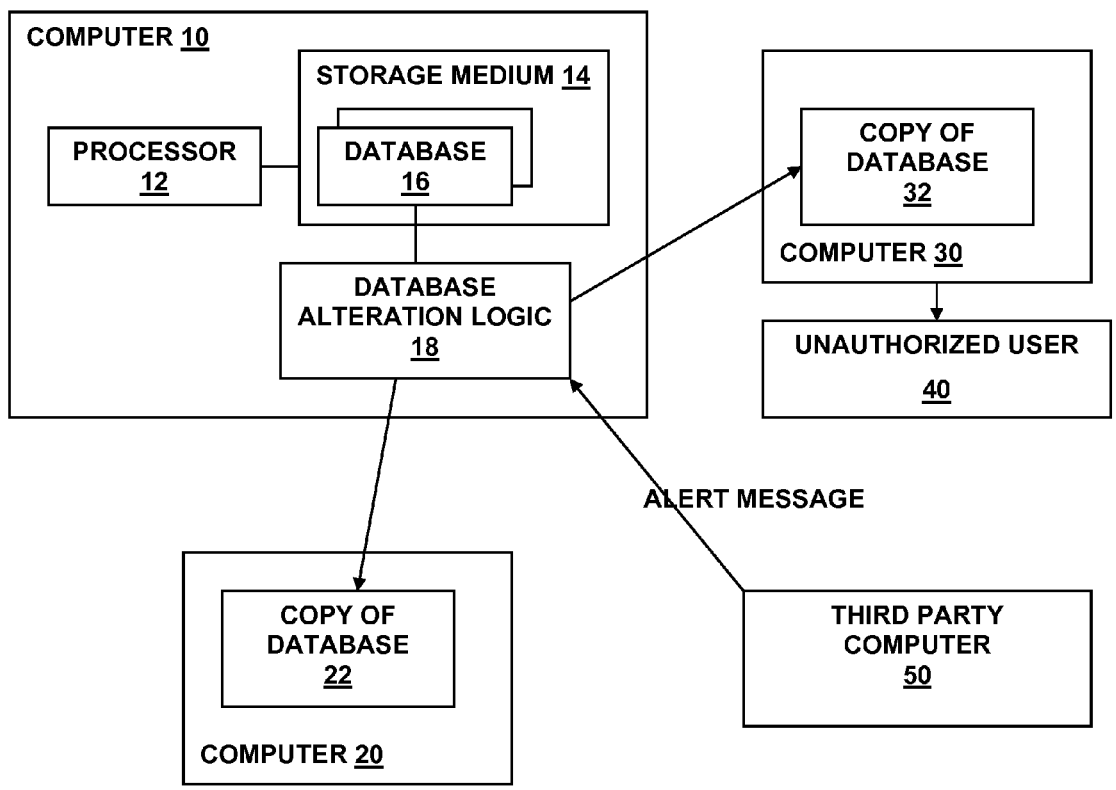
FIG. 1 shows a system in accordance with various embodiments.

FIG. 1 shows a system in accordance with various embodiments. The system comprises computers 10, 20, 30, 40, and 50 which may be implemented as servers or other types of computers. Computer 10 comprises a processor 12 coupled to a computer-readable storage medium 14. The storage medium 14 comprises volatile storage (e.g., random access memory), non-volatile storage (e.g., hard disk drive, read only memory, compact disc read only memory, Flash storage, etc.), or combinations thereof. The storage 14 may be contained within the computer 10. In other embodiments, the storage 14 is separate from, but accessible to, the computer 10 (e.g., a network-attached storage device).

The storage medium 14 contains one or more databases 16. Each database 16 may contain whatever information is desired for the database to contain. In accordance with one example, the database 16 is a relational database and includes a plurality of records and each record includes any one or more of various data fields such as name, address, telephone number, etc. In accordance with other examples, the database is a text file containing data. In accordance with yet other examples, the database is a spreadsheet file containing data. The disclosed technique is applicable to any structure of data which includes records. The term "database" encompasses all such data structures. Each record also includes a value whose use in commerce is detectable by the database owner and/or a third party (i.e., a party other than the owner of the database and all legitimate users of the database). In some embodiments, this value is a payment credential (e.g., credit card number, debit card number, ATM card number, bank account number, etc.) whose use is detectable by the institution (e.g., bank, credit card company, etc.) that issued the payment credential. In other embodiments, the third party detectable value is an email address or postal (mailing) address. In some embodiments, each database entry includes two or more of a payment credential, an email address, and a postal address.

The computer 10 on which the database 16 is stored is owned and/or operated by an entity such as an organization (e.g., a company) or an individual. The owner of the database 16 may desire to provide a copy of the database to one or more other entities such as for a marketing campaign. The owner of the database, however, does not want the recipient of the copy of the database to provide additional copies of the database to others. Embodiments of this disclosure provide a way to detect that a legitimate database recipient (i.e., someone or some organization to whom the owner gave a copy of the database) has leaked a copy of the database without permission from the owner. The database is "marked" in such a way that unauthorized use of the database will be detected. The marking procedure described below can be performed by the database owner himself or by a service supplier to whom the owner transfers the database for marking. The computer 10 is described below as performing the marking, and computer 10 may belong to the database owner or to a supplier.

Referring still to FIG. 1, the computer 10 comprises database alteration logic 18. Database alteration logic 18 may comprise hardware or software executed by processor 12. As software, the database alteration logic 18 is stored on storage medium 14. The database alteration logic 18 alters the database 16 in such a way that an unauthorized leak of the database can be detected.

In accordance with at least some embodiments, the database alteration logic 18 alters the database 16 by adding of one or more artificial records. Each artificial record has the same semantics as the non-artificial records in the database, and is qualified for data processing like any other record in the database 16. An artificial record is generally indistinguishable from the non-artificial records in the database. An artificial record is a record that is added to the database for the purpose of marking the database for leak detection. Each artificial record contains at least one value whose use is traceable by a third party. Examples of such values include payment credentials, email addresses, and mailing addresses, as noted above.

Any transaction using an artificial record presumably will be detected by the parties responsible for processing such transactions. For example, the use of an artificial payment credential will be detected by the bank or institution associated with that credential. Such a transaction may or may not complete, but at any rate the attempted use of the payment credential will be detected. By way of an additional example, if a letter were to be mailed to an artificial address, the postal service will deliver that mail to that address. The received mail can be examined to determine if the item was expected (e.g., what a legitimate party having a copy of the database was expected to send; anything else will presumably have been sent by someone having an unauthorized copy of the database). An email sent to an email address can be detected by, for example, an email server, email client, or other computer configured to detect when such an email has been received. Like physical items being mailed, emails also can be examined to determine whether the sender of the email had an unauthorized copy of the email address. Moreover, systems are established to detect the use of an artificial record. Thus, while the disclosed embodiments do not prevent the database from being provided to someone without permission of the database owner, any attempted use of the unauthorized copy of the database will be detected once one more of the artificial records are actually used.

Figure 2:
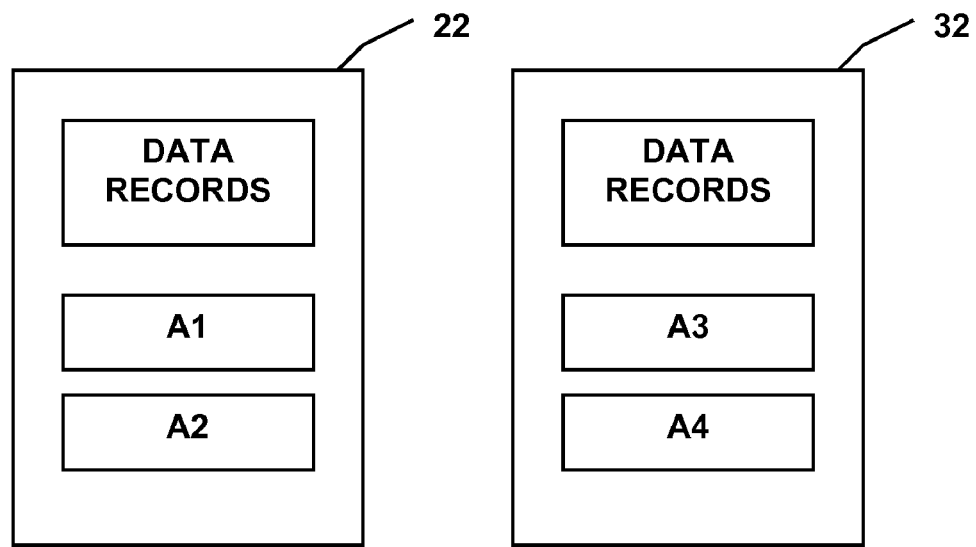

In some situations, it may be desirable to provide copies of databases to more than one recipient. For example, FIG. 1 illustrates that a first copy 22 of a database 16 is provided (e.g., transmitted) to computer 20 and a second copy 32 of the same database 16 is provided (e.g., transmitted) to computer 30. The two database copies are the same (i.e., have the same data records). The entities that own and/or operate computers 20 and 30 have permission from the owner of the database 16 to use their copies 22 and 32 for agreed-upon purposes, but not to provide anyone else with a copy of the database or use the database themselves for unauthorized purposes. The technique described above for marking each copy of the database can be used to detect a leak or unauthorized use. In some embodiments, each copy 22, 32 of the database is marked by database alteration logic 18 with different artificial records. FIG. 2 illustrates copies 22 and 32 having the same underlying data records (i.e., the non-artificial records) but different artificial records. Database copy 22 has two artificial records designated as A1 and A2, while database copy 32 has two different artificial records A3 and A4. If the use of either of the artificial records A1 or A2 is detected, then it is determined that the entity given database copy 22 improperly leaked or used its copy. Similarly, if the use of either of artificial records A3 or A4 is detected, then it is determined that the entity given database copy 32 improperly leaked or used its copy.

It might be possible, however, for the owner/operators of computer 20 and 30 to collude to determine which records in their respective database copies 22, 32 are artificial. For example, the two database copies 22, 32 can be compared, record for record. Since the non-artificial records in database copy 22 are the same as in database copy 32, but the artificial records are different between the two copies, then the records determined to be different between the database copies 22, 32 are deemed to be the artificial records. Such records then can be removed from copies 22, 32 and thus the artificial records will never be used.

Figure 3:
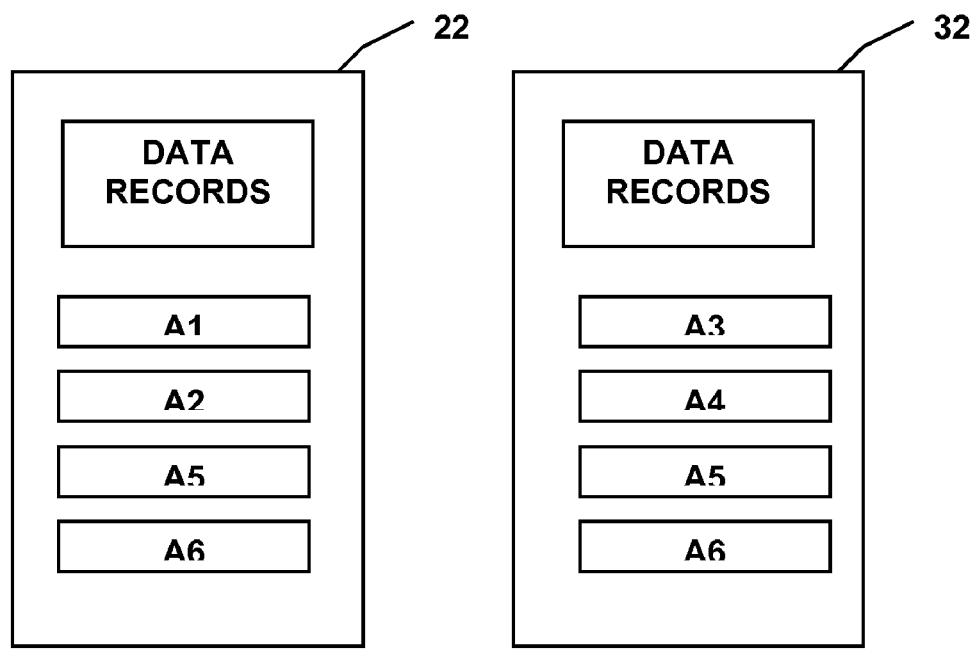

This collusion problem is addressed in accordance with at least some embodiments by marking each copy 22, 32 to include at least one artificial record that is the same in both copies and at least one artificial record in each copy that is not present in the other copy. FIG. 3 illustrates database copy 22 being marked to include artificial records A1, A2, A5, and A6, while database copy 32 is marked to include A3, A4, A5, and A6. Records A1, A2 in copy 22 is different than records A3 and A4 in copy 32, but records A5 and A6 are common to both copies. Thus, in some embodiments, each copy 22, 32 has one or more artificial records that are also present in the other copy and one or more artificial records that are not present in the other copy. In this way, if the owner/operators of computer 20, 30 collude to compare their databases to eliminate any different records, only some of the artificial records are removed; all artificial records that are the same between the two copies cannot be differentiated from the non-artificial records themselves and thus are not removed from the databases. For example, artificial records A1, A2, A3 and A4 may be removed, but not common artificial records A5 and A6. Any subsequent use of such artificial records that remain (A5, A6) is detected.

In some embodiments, three or more database copies are provided to various entities. While FIG. 1 shows two recipients receiving copies of database, three recipients could receive copies of different databases (i.e., different underlying data). FIG. 4 depicts three copies 22, 32, and 36 of a common database. The data records are all the same among the three copies. Copy 22 has been marked with artificial records A1 and A2. Copy 32 has been marked with artificial records A1 and A4. Copy 36 has been marked with artificial records A2 and A4. Artificial record A1 is in common only to the two copies 22 and 32. Artificial record A2 is in common only to the two copies 22 and 36. Artificial record A4 is in common only to the two copies 32 and 36.

Referring still to FIG. 4, the comparison of any two pairs of databases will have at least one common pair of artificial records that is indistinguishable from the data records which also are the same, thereby leaving at least one pair of artificial records in the database copies after the comparison/collusion. The use of such an artificial record indicates that a database has been leaked and the culprit of the leak can be traced to one of the two recipients of the database that had that particular artificial record. For example, if artificial record A1 is detected as being used, then it is determined that the recipient of database copies 22 or 32 leaked the database, and possibly colluded.

In some embodiments, a set of records is used to place each mark. Still referring to FIG. 4, A1, A2, and A4 could each refer to a set of artificial records instead of one artificial record.

The database alteration logic 18 records in, for example, storage 14, which artificial records were added to which database copies. This information is used upon detecting a leak to determine the source of the leak and which database recipients may have colluded.

In general, the more artificial records are added to a database, the lower will be probability of a false negative result, that is, the unauthorized use of a subset of the database records that goes undetected. To have not more than $f_n$ false negative probability for a database with N records, then a value of P can be calculated from the following equation:

$$(1-P)^N < f_n$$

The value of P is the ratio of the number of artificial records to all of the records in the database. For example, if a false negative rate of less than 0.001 is desired for a database with 10,000 records, then, from the equation above, the value of P should be greater than or equal to 0.0007. That is, at least 0.07% of the records in a database should be artificial records for a 10,000 record database to achieve a false negative rate of less than 0.1%. The previous example assumes that the entire database is leaked. In some cases, only a subset of the database records is leaked or improperly used. To deal with these cases, P is still calculated as the ratio of the number of artificial records to the size of the database, but the value N used in the equation refers to the size of the leaked subset of records. For example, if a false negative rate of less than 0.001 (0.1%) is desired for a database with 1,000,000 records when only 10,000 records are leaked form the database, then, from the equation above, the value of P should still be greater than or equal to 0.0007. That is, at least 0.07% of the records in a database should be artificial records to achieve a false negative rate of less than 0.1% for a leaked subset of 10,000 database records.

FIG. 5 illustrates a computer-implemented method of marking one or more copies of a database as explained above. One or more of the actions may be implemented by a computer's processor executing software (e.g., processor 12 of computer 10 executing software that implemented the database alteration logic 18). The method comprises actions 102-110. At 102, a computer (e.g., computer 10) receives a database to be marked. The database may be received by the owner of the database or by a party who the owner has authorized to mark the database on behalf of the owner. For example, the database may be received by a service provider's computer over a network (e.g., the Internet) from the owner of the database. At 104, the method comprises determining the number of artificial records to add to the database. This determination may be based, in some embodiments, on a specified maximum false negative rate as explained above.

At 106, one or more artificial records are added to the database. The artificial records may be selected from a group of previously created records. The value in each artificial record, whose use will be detected by a third party (e.g., bank) is assigned with the assistance of such third party. That is, the third party that will detect the use of the artificial records and the entity that marks the database cooperate to generate the artificial records.

At 108, if more than one copy of the database is to be used, such additional copies are also marked as explained above. The artificial records added to each copy may all be different or be a mix of common and different records as explained previously. At 110, all such marked databases are distributed to their intended recipients.

FIG. 6 illustrates a computer-implemented method for detecting a leak of a database. At 122, a third party computer (e.g., bank, credit card company, email service, etc.) detects the attempted use of an artificial record. In FIG. 1, the third party computer is represented as computer 50. For example, a bank or credit card company detects activity using an artificial payment credential, the postal service customer detects mail being received at a particular artificial mailing address, or an email program or other application detects an email being mailed to a particular email address. At 124, the third party computer generates an alert. The alert may be, for example, a message. The message may include the particular payment credential, email address, or postal address that was being used. At 126, the third party computer sends the alert to the owner of the database (e.g., to computer 10). At 128, the owner's computer receives the alert and, at 130, corrective action is taken.

The corrective action may be to determine which database recipient leaked the database. This action can be performed by comparing the payment credential, email address, or postal address from the alert message with the artificial records added to each database. Further, the corrective action may include alerting the authorities (e.g., police) or contacting the party that leaked the database, or parties that may have colluded.

In some embodiments, a copy of a marked database (or at least a subset thereof) may be given to an entity without permission (leaked). Moreover, a copy of the leaked, marked database may be discovered (e.g., on the Internet). While the records in the leaked database may not have yet been used, the leaked database (or a subset thereof) nevertheless may be examined to detect the mark and thus detect the leak, which can be traced. The false negative rate noted above comprises the probability of failing to detect the mark in a subset (some or all) of the database if it were leaked, subsequently discovered and then analyzed to detect the marks.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   receiving, by a processor, a database containing records;
   determining, by a processor, a number of artificial records to add to the database to achieve a false negative mark detection rate less than a specified threshold; and
   marking, by the processor, said database by adding the determined number of artificial records to the database, each artificial record containing at least one value that, when said database is used following said marking, is detectable by a third party, and wherein each added artificial record is in addition to records already present in the database;
   wherein said false negative rate comprises a probability of failing to detect the mark in a discovered subset of the database.

2. The method of claim 1 wherein determining the number of artificial records to add comprises computing a ratio of artificial records to total records in the database.

3. The method of claim 1 wherein determining the number of artificial records to add comprises computing a formula based on the total number of records in the database and based on a desired false negative rate.

4. The method of claim 1 wherein the value comprises a payment credential.

5. The method of claim 1 wherein the value comprises an email address.

6. The method of claim 1 wherein the value comprises a mailing address.

7. The method of claim 1 further comprising detecting, by a computer operated by the third party, the use of at least one of said artificial records.

8. The method of claim 7 further comprising receiving an alert from said computer that the use of an artificial record has been detected.

9. The method of claim 1 wherein adding one or more artificial records to the database comprises adding one or more artificial records to a first copy of the database, and the method further comprises adding one or more artificial records to a second copy of the database, the artificial records added to the first copy of the database being different than the artificial records added to the second copy of the database.

10. The method of claim 1 wherein adding one or more artificial records to the database comprises adding one or more artificial records to a first copy of the database, and the method further comprises adding one or more artificial records to a second copy of the database;

wherein at least one of the artificial records added to the first copy of the database is not the same as any of the records added to the second copy of the database; and wherein at least one of the artificial records added to the first copy of the database is the same as at least one of the artificial records added to the second copy of the database.

11. A computer-readable storage medium containing software that, when executed by a processor, causes the processor to:

receive a database containing records;

determine a number of artificial records to add to each of a plurality of copies of the database to achieve a false negative mark detection rate less than a specified threshold; and mark each of said copies of the database by adding the determined number of artificial records to each such copy, each artificial record containing at least one value that, when used, is detectable by a third party;

wherein said false negative rate comprises a probability of failing to detect the mark in a discovered subset of the database; and wherein at least one of the artificial records added to the first copy of the database is not the same as any of the records added to the second copy of the database.

12. The computer-readable storage medium of claim 11 wherein said software causes the processor to add at least one common artificial record to the first and second copies of the database.

13. The computer-readable storage medium of claim 11 wherein said value comprises a payment credential.

14. The computer-readable storage medium of claim 11 wherein said value comprises a value selected from a group consisting of an email address and a postal address.

15. The computer-readable storage medium of claim 11 wherein said software causes the processor to determine how many artificial records to add to each copy of the database by computing a formula based on the total number of records in the database and based on a desired false negative rate.

16. The computer-readable storage medium of claim 11 wherein said software causes the processor to receive an alert from a computer that detected the use of the one or more artificial records.

17. A system, comprising:

storage; and database alteration logic coupled to the storage, said database alteration logic marks a database by adding one or more artificial records to the database, each artificial record having the same semantics as non-artificial records in the database and each artificial record having at least one value whose use is detectable by another system;

wherein the database alteration logic marks multiple copies of the same database and each such marked copy includes at least one artificial record that is the same as an artificial record in at least one other copy, and wherein at least one artificial record that is different from an artificial record in at least one other copy.

18. The system of claim 17 wherein the at least one value comprises a payment credential.

19. The system of claim 17 wherein the at least one value comprises an item selected from a group consisting of an email address and a postal address.

20. The computer-readable storage medium of claim 11 wherein each added artificial record is in addition to records already present in the database.

21. The system of claim 17 wherein each added artificial record is in addition to records already present in the database.

* * * * *